Apr. 10, 1923.
G. W. DANIELS
AUTOMOBILE LOCK
Filed July 15, 1921
1,450,943
2 sheets-sheet 1
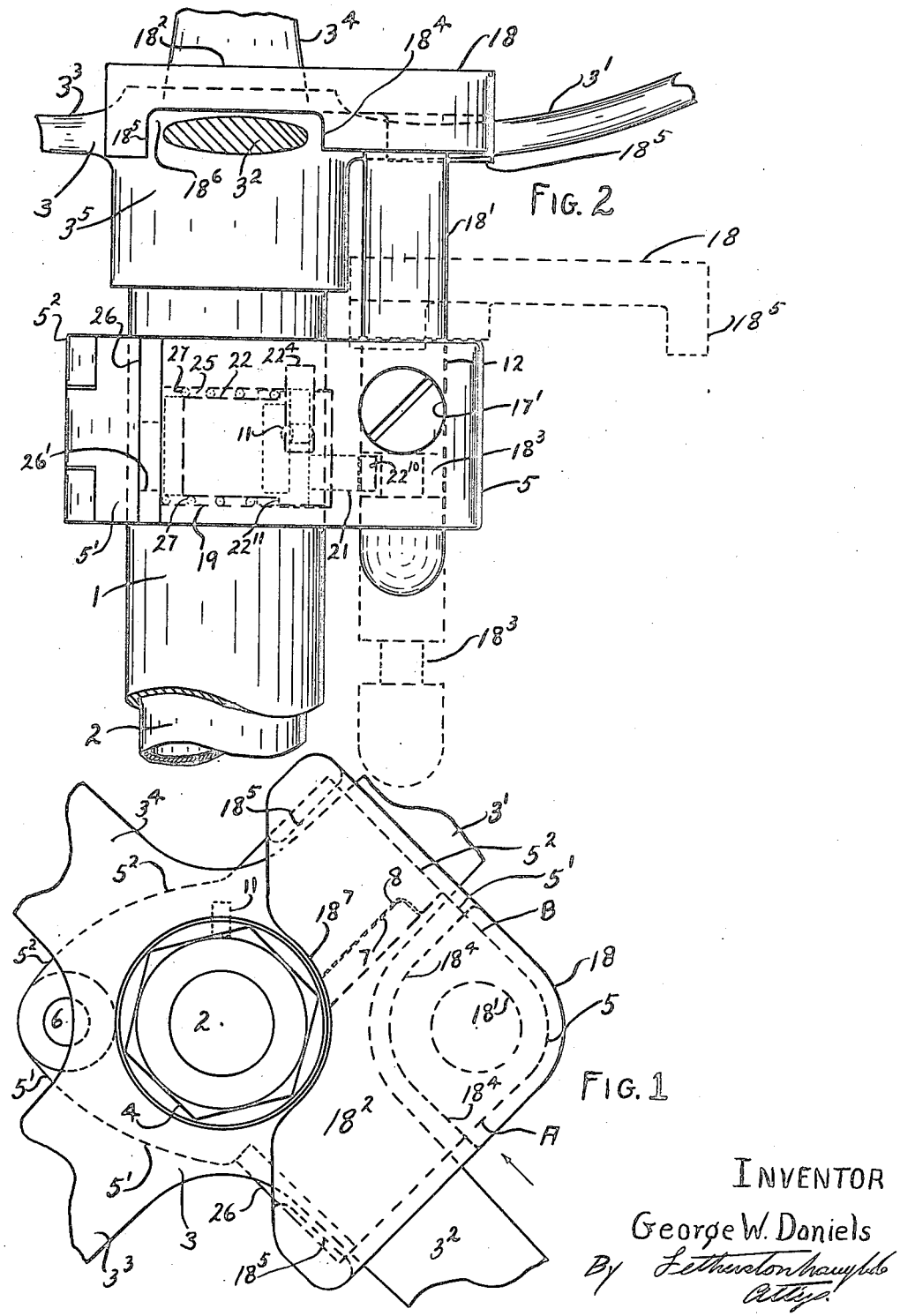
INVENTOR
George W. Daniels

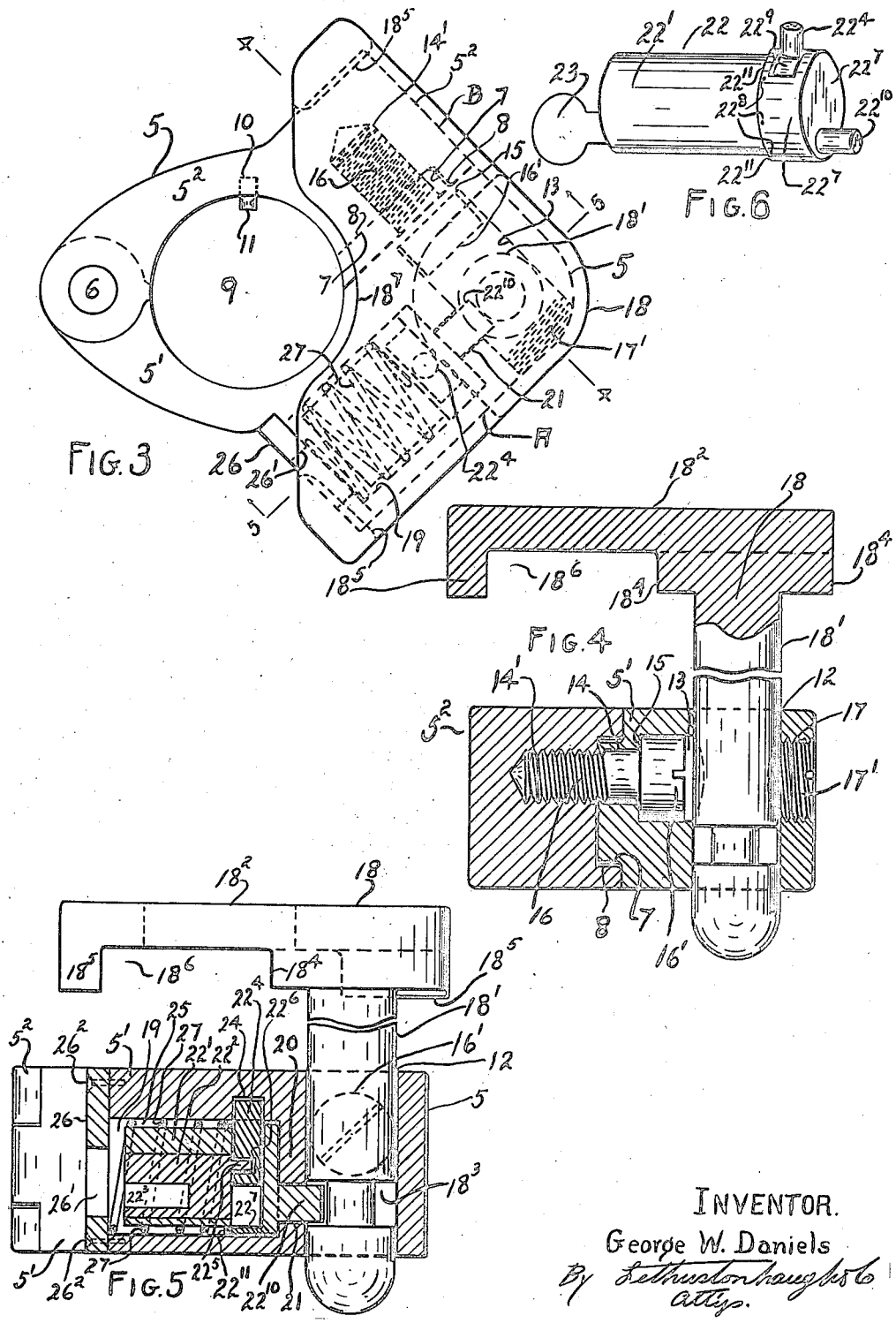

Patented Apr. 10, 1923.

1,450,943

UNITED STATES PATENT OFFICE.

GEORGE WILLIAM DANIELS, OF HAMILTON, ONTARIO, CANADA.

AUTOMOBILE LOCK.

Application filed July 15, 1921. Serial No. 484,990.

*To all whom it may concern:*

Be it known that I, GEORGE WILLIAM DANIELS, a subject of the King of Great Britain, and a resident of the city of Hamilton, in the county of Wentworth, in the Province of Ontario, Dominion of Canada, have invented certain new and useful Improvements in Automobile Locks, of which the following is a specification.

My invention relates to improvements in automobile locks with particular reference to that type in which the steering wheel of the automobile is locked in order to render the steering mechanism inoperative and the object of the invention is to provide a lock of this general type which will be small and compact, which may be readily attached to any automobile and which will be of simple and inexpensive construction; a further object is to provide a lock which will prevent both rotation and removal of the steering wheel and a still further object is to so construct the device that it will be absolutely inaccessible and non-removable when in the locked position but will permit ready and convenient access to all parts thereof when in the unlocked position.

My invention consists essentially of a hinged bracket adapted to be rigidly secured to the stationary steering column of an automobile, a lock carried in the bracket, a clamp member having a head portion and a shank depending therefrom, the shank having longitudinal sliding freedom and rotative freedom within an orifice in the bracket, the upper portion of the shank adapted to extend upwardly between adjacent spokes of the wheel, and the head of the clamp adapted to engage the upper faces of said adjacent spokes when in the locking position, the clamp adapted to occupy a position out of operative connection with the steering wheel when in the unlocked position, and the lock in the bracket adapted to engage the shank of the clamp for securing it in the locked position, all as hereinafter more particularly described and illustrated in the accompanying drawings in which:

Fig. 1 is a plan view of a portion of the steering wheel and stationary steering column of an automobile, showing my invention applied thereto, the apparatus being in the locked position.

Fig. 2 is an elevation of Fig. 1 looking in the direction of the arrow (see Fig. 1). The full lines indicate the apparatus in the locked position and the broken lines indicating the unlocked position.

Fig. 3 is a plan view of my device, detached from the steering column, and showing the various parts of the device in the locked position.

Fig. 4 is a vertical section on the line 4, 4 of Fig. 3.

Fig. 5 is a vertical section on the line 5, 5 of Fig. 3 looking in the direction of the arrows.

Fig. 6 is a perspective view of a cylinder lock used in my invention.

Like characters of reference indicate corresponding parts in the different views.

1 indicates the stationary steering column of an automobile and 2 the rotatable steering post which is carried within the stationary column.

3 is the steering wheel which is rigidly secured to the upper end of the steering post 2 in the usual manner by the nut 4 and has a bearing on the upper end of the stationary column 1.

$3^1$, $3^2$, $3^3$ and $3^4$ are the spokes of the steering wheel and $3^5$ is the hub thereof.

5 is a split bracket comprising the two sections $5^1$ and $5^2$ which are hingedly connected by the pin 6.

The sections $5^1$ and $5^2$ comprise the male and female engaging surfaces 7 and 8 respectively.

The bracket 5 is provided with the large orifice 9 therein, said orifice extending partly into each of the sections $5^1$ and $5^2$ of the bracket.

The inner wall of the orifice 9 is provided with a small orifice 10 adapted to receive a dowel pin 11 and the stationary column 1 is also provided with a corresponding orifice for a purpose as will hereinafter appear.

The edges "A" and "B" of the bracket remote from the hinge pin 6 are approximately at right angles to one another.

Adjacent to the junction of the edges "A" and "B" the section $5^1$ is provided with a longitudinal orifice 12 extending therethrough.

The section $5^1$ is provided with a transverse orifice 13 extending inwardly from the edge "A" and parallel with the edge "B." The axis of the orifice 13 intercepts perpendicularly the axis of the orifice 12.

Extending axially and concentrically from the inner end of the orifice 13 is an orifice 14 of reduced diameter which forms a shoulder 15 at the base of the orifice 13. This orifice 14 extends completely through the section $5^1$ to the male surface 7.

The section $5^2$ is provided with a threaded orifice $14^1$ extending inwardly from the female surface 8 and adapted to register with the orifice 14 and to form a continuation thereof when the two sections of the bracket 5 are in the closed position (see Fig. 4).

16 is a screw which freely engages the orifices 13 and 14 in the section $5^1$ and has threaded engagement with the orifice $14^1$ in the section $5^2$.

The enlarged head $16^1$ of the screw freely engages the orifice 13 while the shank freely engages the reduced size orifice 14. The under face of the head $16^1$ is adapted to engage the shoulder 15 for a purpose as will appear.

The outer end of the orifice 13 is threaded at 17 and $17^1$ is a screw plug adapted to engage said threaded portion.

18 is a clamping member having the cylindrical shank $18^1$ and the head $18^2$ disposed at right angles to the shank.

Adjacent to its lower end the shank $18^1$ is cut away to form an annular recess $18^3$ for a purpose as will appear.

The upper end of the shank at its point of junction with the head terminates in an enlarged boss $18^4$.

The shape of the head $18^2$ is substantially that of a right angle triangle with the shank $18^1$ depending from the right angle.

At the two acute angular points of the head are carried depending lugs $18^5$, and the body of the head itself virtually forms a web connecting the boss $18^4$ of the shank and lugs $18^5$ between which are formed the upwardly disposed recesses $18^6$.

The long side of the head is cut away at $18^7$ for a purpose as will appear.

The shank $18^1$ is adapted to freely engage the orifice 12 in the bracket 5.

The section $5^1$ is provided with a large circular recess 19 extending inwardly from one side edge thereof and disposed parallel to the side edge "A", the axis of the recess intercepting perpendicularly the axis of the orifice 12 (see Fig. 3). The recess 19 does not extend as far as the orifice 12 being separated therefrom by a portion 20 of the section $5^1$ which forms a wall between the recess 19 and the orifice 12.

21 is a small orifice extending through the wall 20 and connecting the inner end of the recess 19 with the orifice 12 and is located eccentrically of the recess 19 and below the axis thereof.

22 is a cylinder lock of the common tumbler type which comprises the outer non-rotatable casing $22^1$ and the inner rotatable barrel $22^2$ which is operated by the key 23 engaging the keyhole $22^3$.

$22^4$ is the bolt of the lock which is operated from the barrel $22^2$ through the eccentric stud $22^5$ engaging a recess $22^6$ in the bolt.

These features of the lock are of standard design and form no part of my present invention so that it is not thought necessary to describe the lock construction in further detail.

$22^7$ is an end sleeved cap which engages the inner end of the casing $22^1$ and is secured thereto by the rivets $22^8$.

This sleeve is provided with a cut away portion $22^9$ in its upper side wall to permit passage of the bolt $22^4$ and carries an eccentric stud $22^{10}$ extending longitudinally from the bottom of the end face.

The junction of the end of the sleeve $22^7$ with the outer peripheral surface of the casing $22^1$ forms a shoulder $22^{11}$.

The lock 22 is adapted to be inserted into the recess 19 and the outer peripheral surface of the sleeved cap $22^7$ freely engages the surface of the recess.

As the lock is inserted into the recess 19 the stud $22^{10}$ freely engages the orifice 21, and 24 is a recess in the section $5^1$ which is adapted to receive the bolt $22^4$ when the lock is fully inserted. Also when the lock is fully inserted the stud $22^{10}$ extends beyond the wall 20 and into the orifice 12 (see Fig. 5).

25 is an annular chamber formed between the casing $22^1$ of the lock and the wall of the recess 19.

26 is a cover plate secured to the section $5^1$ and provided with the orifice $26^1$. This plate covers the outer end of the recess 19 and is secured to the section $5^1$ by the screws $26^2$.

27 is a coil spring located within the annular chamber 25, one end of which engages the shoulder $22^{11}$ on the lock and the other end engages the inner face of the cover plate 26 (see Fig. 5).

The construction and operation of my invention is as follows:

The two sections $5^1$ and $5^2$ of the bracket 5 are hingedly connected by the hinge pin 6.

The lock 22 is slidably mounted within the recess 19 in the section $5^1$ of the bracket and the pin $22^{10}$ engages the orifice 21 in the wall 20. This locates the casing $22^1$ of the lock against rotation, since the pin $22^{10}$ is eccentrically situated on the lock and insures that the bolt $22^4$ of the lock, which has a reciprocatory motion will be maintained in the correct angular relation to engage the orifice 24 in the wall of the recess 19.

The coil spring 25 is next inserted and the cover plate 26 is attached which secures the lock against removal.

It will be noted that the spring 25 will tend to normally force the lock 22 inwardly into the locked position shown in Fig. 5.

The dowel pin 11 is now mounted in the bracket 5.

This bracket is mounted upon the stationary steering column 1 by clamping the two sections $5^1$ and $5^2$ about the column so that the column engages the large orifice 9, the column having been suitably drilled to receive the dowel pin 11 for properly locating the bracket upon the stationary column.

The two sections of the bracket are then fastened together by means of the screw 16 which is inserted into the orifice 13. The head of the screw engages the shoulder 15 in the section $5^1$ of the bracket while the threaded portion engages the threaded orifice $14^1$ in the section $5^2$.

When the screw is tightened it will be apparent that the two halves of the bracket are drawn together to tightly clamp the stationary column 1 thus securing the bracket rigidly in position upon the column.

The screw cap $17^1$ is now inserted to close the outer end of the orifice 13.

The clamping member 18 is now mounted by inserting the shank $18^1$ into the orifice 12 in the bracket.

Consider now the device to be mounted upon the steering column and the various parts to be in the locked position with the clamping member 18 engaging the steering wheel for rendering the steering mechanism inoperative. This position is illustrated in Fig. 1 and also in full lines in Fig. 2, and the device detached from the steering column, but with the parts in the locked position as shown in Figs. 3, 4 and 5.

The operation of the clamping member 18 will be clearly understood from Figs. 1 and 2 from which it will be noted that the upper end of the shank $18^1$ projects between the adjacent spokes $3^1$ and $3^2$ of the wheel thus preventing rotation of the wheel. Also the head $18^2$ extends over the top of these two spokes so that the wheel cannot be removed from the steering post. Further the depending lugs $18^5$ prevent rotation of the clamping member since they would engage the spokes immediately rotation of the member were attempted. It is necessary to provide against rotation of the clamping member 18, when in the locked position, as otherwise it could be rotated through approximately 180° so that the head thereof would clear the spokes of the wheel thus permitting removal of the wheel from the steering post and the substitution of some other means of steering.

In order to still further increase the security of the lock, the head $18^2$ of the clamping member is made to cover a considerable portion of the hub of the steering wheel and the boss $18^4$ is provided on its under face.

By this means the inner ends of the spokes engaged by the clamp are rendered inaccessible to a cutting tool such as a hack saw or the like. The value of this feature will be readily understood as it is apparent that if it were possible to cut away the spokes of the wheel to clear the clamping member it would be possible to remove the steering wheel entirely.

The cut away portion $18^7$ is provided in the head of the clamping member to provide clearance for the nut 4 securing the wheel to the steering post 2.

The clamping member 18 is locked in the locking position by means of the cylinder lock 22 carried in the bracket 5.

The action of the lock 22 will be clearly understood from the drawings.

Normally, as previously stated, the coil spring 25 will force the lock, which is slidably mounted in the recess 19, into its innermost position (see Fig. 6) in which position the stud $22^{10}$, extends into the orifice 12. When the clamping member 18 is in the locking position the annular recess $18^3$ in the shank registers with the orifice 21 so that the stud $22^{10}$ engages said annular recess and prevents all longitudinal movement of the clamping member.

The lock is locked in this position by turning the rotatable barrel $22^2$ by means of the key 23, so that the bolt $22^4$ engages the orifice 24.

It will now be clear that with the various parts in the locked position, as above described, the device constitutes a perfect lock which renders the steering mechanism entirely inoperative and by locking the steering wheel with the steering at full lock to one side an extremely efficient anti-theft device results.

A further valuable feature of my invention resides in the novel construction whereby all vital parts of the device are entirely inaccessible and not subject to interference or damage when the device is in the locked position.

From Figs. 4 and 5 it will be noted that in the locked position the screw 16 securing the two sections of the bracket 5 together is entirely inaccessible and is protected by the full thickness of the shank $18^1$ of the clamping member. This is made possible by having the stud $22^{10}$ carried eccentrically near the bottom of the cap $22^7$.

Further by the provision of the male and female engaging faces 7 and 8 of the two sections of the bracket 5 it is rendered impossible to get at the screw 16 to cut it with a cold chisel or to pry the two sections apart.

All exposed parts of the device will in all probability be case hardened to render the cutting or otherwise damaging of the parts practically impossible.

The operation of unlocking is as follows:

The bolt $22^4$ is withdrawn from engagement with the recess 24 by rotating the barrel $22^2$ with the key 23 and the entire lock 22 is then drawn outwardly in the recess 19 against the pressure of the coil spring 25 by simply pulling outwardly with the key. In this operation the stud $22^{10}$ is withdrawn from engagement with the annular recess $18^3$ in the clamping member, which member is then slightly raised by hand and rotated to clear the spokes of the steering wheel and is then allowed to fall into its inoperative position shown dotted in Fig. 2 in which it has no engagement whatever with the steering wheel.

It will be noted that the lock 22 will at all times tend to move inwardly automatically under the action of the spring 25 so that the stud $22^{10}$ will be in the locking position and it may only be held withdrawn by holding the lock withdrawn by hand.

The clamping member 18 may, of course, be entirely removed from the bracket 5 if desired when the lock 22 is withdrawn to the unlocked position.

As previously stated it will be impossible to remove the key from the lock unless the lock 22 is in the locked position since only in this position does the bolt $22^4$ register with the recess 24. In all other positions it is held depressed by contact with the wall of the recess 19 and the tumblers of the lock cannot move into the position to permit removal of the key.

It is to be noted that at all times the stud $22^{10}$ is engaged in the orifice 21, so that no rotation whatever of the casing $22^1$ of the lock 22 can occur and therefore the bolt $22^4$ is always in the correct angular position to engage the recess 24.

Various modifications might be made in my invention without departing from the spirit of the invention or the scope of the claims and therefore the forms shown are to be taken as illustrative only and not in a limiting sense.

For instance, the actual shape of the head of the clamping member might be altered, also the annular recess in the shank of the clamping member might be replaced by an ordinary orifice.

From the foregoing it will be noted that I have devised an improved automobile lock which will be of great value, which may be simply fitted to any automobile and which will provide a safe and positive means of preventing unauthorized use of the automobile by rendering the steering mechanism entirely inoperative.

What I claim as my invention is:

1. In a device of the class described, a clamping member comprising a flat head portion of substantially the shape of a right angle triangle, a shank portion depending from the head portion and situated adjacent to the right angle, the shank provided with an annular recess adjacent to the lower end thereof, an enlarged boss carried by the upper end of the shank at its junction with the head, depending lugs carried by the head at the acute angular points thereof, the aforesaid boss and the depending lugs forming between them recesses in the under face of the head.

2. In a locking device for automobiles, the combination with a stationary steering column and a steering wheel, of a body member rigidly carried by the stationary column, and having a vertical orifice extending therethrough, the body member also having a horizontal recess extending inwardly from one side edge thereof, a portion of the body member forming a wall separating the recess from the vertical orifice, said wall having a horizontal communicating orifice between the recess and vertical orifice, a clamping member comprising a shank slidably carried within the vertical orifice, the upper end of the clamping member adapted to engage the steering wheel, the shank having a recess adjacent to its lower end, a locking member slidably mounted within the horizontal recess in the body member, a stud carried by the inner end of the locking member and extending longitudinally therefrom and engaging the aforesaid communicating orifice, spring means normally forcing the lock inwardly to engage the inner end of the recess in which position the stud projects through the communicating orifice into the vertical orifice and is adapted to engage the recess in the shank, and means for withdrawing the locking member and stud to release the engagement between the stud and shank.

3. In a locking device for automobiles, the combination with a stationary steering column and a steering wheel, of a body member rigidly carried by the stationary column and having a vertical orifice extending therethrough, the body member also having a horizontal recess extending inwardly from one side edge thereof, the axes of the vertical orifice and horizontal recess intersecting each other, a portion of the body member forming a wall separating the recess from the vertical orifice, said wall having a horizontal communicating orifice between the recess and vertical orifice, said communicating orifice located eccentrically of the horizontal recess and below the centre thereof, a clamping member comprising a shank slidably carried within the vertical orifice, the upper end of the clamping member adapted to engage the steering wheel, the shank having an annular recess adjacent to its lower end, a cylinder lock slidably mounted within the horizontal recess in the body member, a transversely reciprocating bolt carried by said lock, the body member provided with a recess in the wall of the horizontal recess, said reciprocating bolt adapted to register with and engage said recess when the lock is in its innermost position in the horizontal recess, a stud carried by the inner end of the lock and extending longitudinally therefrom and engaging the aforesaid communicating orifice, spring means normally forcing the lock inwardly to engage the inner end of the recess in which position the stud projects through the communicating orifice into the vertical orifice and is adapted to engage the recess in the shank, and means for withdrawing the cylinder lock to release the engagement between the stud and shank.

4. In a locking device for automobiles, the combination with a stationary steering column and a steering wheel, of a split bracket rigidly secured upon the stationary column, said split bracket comprising two sections and having a large orifice in the central part thereof adapted to engage the stationary column, the two sections being hingedly connected at one side of the large central orifice, male and female engaging surfaces between the two sections at the side of the bracket remote from the hinge connection, a screw within the bracket extending transversely of said male and female engaging surfaces and securing the two sections together, the head of said screw being sunk into the bracket, a clamping member comprising a shank slidably carried within a vertical orifice in the bracket, the upper end of the clamping member adapted to engage the steering wheel, a locking member in the bracket and co-acting with the shank for securing said shank against longitudinal movement, said shank entirely covering the head of the aforesaid securing screw when the shank is in the locked position.

5. In a locking device for automobiles, the combination with a stationary steering column and a steering wheel having the usual hub and spokes, of a split bracket rigidly secured upon the stationary column, said split bracket comprising two sections and having a large orifice in the central part thereof adapted to engage the stationary column, the two sections being hingedly connected at one side of the large central orifice, male and female engaging surfaces between the two sections at the side of the bracket remote from the hinge connection, a screw within the bracket extending transversely of said male and female engaging surfaces and securing the two sections together, the head of said screw being sunk into the bracket, a clamping member comprising a head portion and a shank portion depending therefrom, said shank portion slidably mounted in a vertical orifice in the bracket and adapted to extend upwardly between two spokes of the wheel and in proximity to the hub thereof, the head portion forming a plate covering the upper faces of said spokes and the adjacent portion of the hub of the wheel, depending lugs carried by the head and engaging the side edges of the aforesaid spokes remote from the shank, and a locking member in the bracket co-acting with the shank for securing said shank against longitudinal movement, said shank entirely covering the head of the aforesaid securing screw when the shank is in the locked position.

6. In a device of the class described, a split bracket comprising two sections hingedly connected together at one corner thereof and having a vertical orifice in the central portion thereof, the sections having male and female engaging surfaces at the side of the central orifice remote from the hinge, the bracket having a second vertical orifice extending therethrough adjacent to the corner remote from the hinge connection, the bracket having a horizontal orifice extending inwardly from one side edge and intersecting the second vertical orifice and the male and female engaging surfaces, a screw engaging the horizontal orifice for rigidly securing the two sections of the bracket together, said screw adapted to the entirely to the inner side of the second vertical orifice, the bracket having a horizontal recess extending thereinto from one edge thereof, the axis of said recess intersecting the axis of the second vertical orifice, a wall separating the recess from the second vertical orifice, said wall provided with a horizontal communicating orifice connecting the recess and second vertical orifice, said communicating orifice situated eccentrically of the recess and adjacent to the bottom thereof and being entirely below the first mentioned horizontal orifice, a cylinder lock slidably mounted in the horizontal recess, a stud eccentrically carried by the inner end of the lock and extending longitudinally therefrom, said stud engaging the aforesaid communicating orifice, spring means normally forcing the lock into its innermost position in the recess, in which position the said stud projects into the second vertical orifice, and means for drawing the lock outwardly to withdraw the stud from the second vertical orifice.

7. In a device of the class described, a split bracket comprising two sections hingedly connected together at one corner thereof and having a vertical orifice in the central portion thereof, a dowel pin carried by the bracket and extending into the central orifice, the sections having male and female engaging surfaces at the side of the central orifice remote from the hinge, the bracket having a second vertical orifice extending therethrough adjacent to the corner remote from the hinge connection, the bracket having a horizontal orifice extending inwardly from one side edge and intersecting the second vertical orifice and the male and female engaging surfaces, a screw engaging the horizontal orifice for rigidly securing the two sections of the bracket together, said screw adapted to lie entirely to the inner side of the second vertical orifice, the bracket having a horizontal recess extending thereinto from one edge thereof, the axis of said recess intersecting the axis of the second vertical orifice, a wall separating the recess from the second vertical orifice, said wall provided with a horizontal communicating orifice connecting the recess and second vertical orifice, said communicating orifice situated eccentrically of the recess and adjacent to the bottom thereof and being entirely below the first mentioned horizontal orifice, a cylinder lock slidably mounted in the horizontal recess, a stud eccentrically carried by the inner end of the lock and extending longitudinally therefrom, said stud engaging the aforesaid communicating orifice, a transversely reciprocating bolt carried by said lock, the wall of the recess provided with an orifice adjacent to its inner end, said bolt adapted to register with and engage said recess when the lock is in its innermost position in the horizontal recess, spring means normally forcing the lock into its innermost position in the recess in which position the said stud projects into the second vertical orifice, and means for drawing the lock outwardly to withdraw the stud from the second vertical orifice.

GEORGE WILLIAM DANIELS.

Witnesses:
JOHN G. HAYWARD,
NORRIS COLES.